United States Patent
Baqai et al.

(10) Patent No.: US 7,558,423 B2
(45) Date of Patent: Jul. 7, 2009

(54) ERROR ANALYSIS FOR IMAGE INTERPOLATION AND DEMOSAICING USING LATTICE THEORY

(75) Inventors: Farhan A. Baqai, Fremont, CA (US); Alexander Berestov, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 714 days.

(21) Appl. No.: 11/394,836

(22) Filed: Mar. 31, 2006

(65) Prior Publication Data

US 2007/0236580 A1    Oct. 11, 2007

(51) Int. Cl.
G06K 9/00 (2006.01)
G06K 9/32 (2006.01)
G09G 5/00 (2006.01)
H04N 1/46 (2006.01)

(52) U.S. Cl. .................. 382/167; 382/300; 345/648; 345/649; 358/525

(58) Field of Classification Search .......... 382/166, 382/167, 294–300; 345/648, 649; 358/525
See application file for complete search history.

(56) References Cited

U.S. PATENT DOCUMENTS

| | | | | |
|---|---|---|---|---|
| 3,971,065 | A | | 7/1976 | Bayer .......................... 358/41 |
| 6,226,409 | B1 | * | 5/2001 | Cham et al. ................. 382/228 |
| 6,989,862 | B2 | | 1/2006 | Baharav et al. ............. 348/273 |
| 2004/0086177 | A1 | * | 5/2004 | Zhang et al. ................ 382/167 |
| 2004/0130638 | A1 | * | 7/2004 | Sakamoto .................... 348/254 |
| 2009/0086060 | A1 | * | 4/2009 | Lee ............................. 348/234 |

OTHER PUBLICATIONS

Nadadur et al. ("A Bayesian framework for noise covariance estimation using the facet model", IEEE Trans. Image Processing, vol. 14, No. 11, Nov. 2005, pp. 1902-1917).*
IBM Technical Disclosure Bulletin, Jan. 1990, vol. 32, Issue 8B, pp. 240-241.*
Peter D. Burns et al., "Error Propagation Analysis in Color Measurement and Imaging", Eastman Kodak Company, Imaging Research and Development Laboratories Jan. 11, 1997, pp. 280-289.
Michael J. Vrhel et al., "Filter Considerations in Color Correction",IEEE Transactions on Image Processing, vol. 3, No. 2, Mar. 1994, pp. 147-161.

(Continued)

*Primary Examiner*—Yubin Hung
(74) *Attorney, Agent, or Firm*—Haverstock & Owens LLP (57) ABSTRACT

A spatial transformation methodology provides a new image interpolation scheme, or analyzes an already existing one. Examples of spatial operations include but are not limited to, demosaicing, edge enhancement or sharpening, linear filtering, and non-linear filtering. A demosaicing operation is described herein, although the scheme is applied generally to spatial transformation operations. The spatial transformation methodology includes detailed expressions for the noise covariance after a spatial operation is performed for each of the three color channels, red, green, and blue. A color filter array is in the form of a Bayer pattern and demosaicing is performed using a 4-neighbor bilinear interpolation. Using lattice theory, the spatial transformation methodology predicts noise covariance after demosaicing in terms of the input noise covariance and an autocorrelation function of the image is determined for a given selectable number of shifts.

47 Claims, 5 Drawing Sheets

OTHER PUBLICATIONS

Gaurav Sharma et al., "Optimal Nonnegative Color Scanning Filters", Xerox Corporation, Webster, N.Y., National Institutes of Health, Bethesda, pp. 1-13.

Daniel D. Lee et al., "Algorithms for Non-negative Matrix Factorization", pp. 1-7.

Daniel D. Lee et al., "Learning the Parts of Objects by Non-Negative Matrix Factorization", 1999 Macmillan Magazines Ltd., pp. 788-791.

* cited by examiner

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

Fig. 1

|       | (0,0) |  | (0,2) |  | (0,4) |  |
|-------|---|---|---|---|---|---|
| (0,0) | R |   | R |   | R |   |
|       |   |   |   |   |   |   |
| (2,0) | R |   | R |   | R |   |
|       |   |   |   |   |   |   |
| (4,0) | R |   | R |   | R |   |
|       |   |   |   |   |   |   | x-plane

Fig. 2

| R |   | R |   | R |   |
|---|---|---|---|---|---|
|   | X |   | X |   | X |
| R |   | R |   | R |   |
|   | X |   | X |   | X |
| R |   | R |   | R |   |
|   | X |   | X |   | X |

| R |   | R |   | R |   |
|---|---|---|---|---|---|
|   | R |   | R |   | R |
| R |   | R |   | R |   |
|   | R |   | R |   | R |
| R |   | R |   | R |   |
|   | R |   | R |   | R | y-plane

Fig. 5

| R | X | R | X | R | X |
|---|---|---|---|---|---|
| X | R | X | R | X | R |
| R | X | R | X | R | X |
| X | R | X | R | X | R |
| R | X | R | X | R | X |
| X | R | X | R | X | R |

Fig. 6

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R | z-plane

ERROR ANALYSIS FOR IMAGE INTERPOLATION AND DEMOSAICING USING LATTICE THEORY

FIELD OF THE INVENTION

The present invention relates to the field of video processing and noise transformations. More particularly, the present invention relates to the field of error analysis for spatial transformation modeling using lattice theory.

BACKGROUND OF THE INVENTION

Digital cameras and other image capture devices use image sensors that comprise a plurality of sensor elements. A Bayer filter is a color filter array (CFA) for arranging RGB color filters on a square grid of sensor elements. The term derives from the name of its inventor, Bryce Bayer of Eastman Kodak, and refers to a particular arrangement of color filters used in most single-chip digital cameras. When a Bayer pattern is used, filtering is provided such that every other pixel collects green light information ("green pixels") and the pixels of alternating rows of the sensor collect red light information ("red pixels") and blue light information ("blue pixels"), respectively, in an alternating fashion with pixels that collect green light information.

The raw output of Bayer-filter cameras is referred to as a Bayer Pattern image. Since each pixel is filtered to record only one of the three colors, two-thirds of the color data is missing from each. Demosaicing algorithms estimate missing color information by interpolation of the known color information across different color planes. Many different algorithms exist. Such demosaicing algorithms estimate the missing color information for each given pixel position by evaluating the color information collected by adjacent pixels. For instance, when estimating the red light information for a green pixel, the demosaicing algorithm evaluates red (and potentially blue and green) color information collected by neighboring pixels. Through this process, the missing color information can be interpolated.

Demosaicing is but one image data transformation performed as part of an image processing system. Transformations generally include linear transformations, non-linear transformations, and spatial transformations. Application of image data transformations must account for noise propagation through the image processing system. The Burns and Berns method provides a mechanism for propagating noise covariance through linear and non-linear camera transformations. However, their work did not address the problem of propagating noise covariance through spatial transformations.

Spatial transformations alter the spatial relationships between pixels in an image by mapping locations in an input image to new locations in an output image. Common transformational operations include resizing, rotating, and interactive cropping of images, as well as geometric transformations with arbitrary dimensional arrays. Spatial operations include, but are not limited to demosiacing, edge enhancement or sharpening, linear filtering, and non-linear filtering.

SUMMARY OF THE INVENTION

Embodiments of a spatial transformation methodology are used to design a new image interpolation scheme, or analyze an already existing one. Examples of spatial operations include but are not limited to, demosaicing, edge enhancement or sharpening, linear filtering, and non-linear filtering. A demosaicing operation is described herein, although the scheme is applied generally to spatial transformation operations. The spatial transformation methodology includes detailed expressions for the noise covariance after a spatial operation is performed for each of the three color channels, red, green, and blue.

In one embodiment, the color filter array is in the form of a Bayer pattern and demosaicing is performed using a 4-neighbor bilinear interpolation. Using lattice theory, the spatial transformation methodology predicts output noise covariance after demosaicing in terms of the input noise covariance and an autocorrelation function of the image is determined for a given selectable number of shifts.

In one aspect, a method of predicting noise propagation after performing a demosaicing operation is described. The method includes obtaining an input image signal including a plurality of color channels, each color channel including a portion of a corresponding color channel data, wherein the input image signal includes a corresponding input noise covariance, demosaicing each color channel to determine a remaining portion of each color channel data, determining an autocorrelation for each color channel, and determining an output noise covariance for each color channel according to the input noise covariance and the autocorrelation for the corresponding color channel. Demosaicing can comprise performing a bilinear interpolation. Demosaicing can also comprise performing a 4-neighbor bilinear interpolation. Each color channel data of the input image signal can correspond to an x-plane and demosaicing can comprise performing a first interpolation step to generate a y-plane for each color channel data and performing a second interpolation step to generate a z-plane for each color channel data. Determining the output noise covariance can comprise determining an intermediate noise covariance according to the input noise covariance and an autocorrelation for the x-plane of each color channel. The autocorrelation for the x-plane can be determined by correlating two or more images according to zero, one, or multiple shifts. The output noise covariance can be determined according to the intermediate noise covariance and an autocorrelation for the y-plane of each color channel. The autocorrelation for the y-plane can be determined by correlating the two or more images according to zero, one, or multiple shifts. The method can also include providing the input image signal from a color filter array. The color filter array can be configured according to a Bayer pattern. The method can also include defining a periodic model associated with the input image signal, wherein the periodic model defines periodic boundary conditions for the input image signal.

In another aspect, an image capturing system including an image sensing module to detect an input image signal, wherein the input image signal includes a plurality of color channels, each color channel including a portion of a corresponding color channel data, further wherein the input image signal includes a corresponding input noise covariance, and a processing module coupled to the image sensing module, wherein the processing module is configured to demosaic each color channel to determine a remaining portion of each color channel data, to determine an autocorrelation for each color channel, and to determine an output noise covariance for each color channel according to the input noise covariance and the autocorrelation for the corresponding color channel. The image capturing system can also include imaging optics to receive input light from an image, to filter the received input light to form the input image signal, and to provide the input image signal to the image sensing module. The processing module can also be configured to demosaic each color channel by performing a bilinear interpolation. The bilinear interpolation can comprise a 4-neighbor bilinear interpolation. Each color channel data of the input image signal can corresponds to an x-plane and the processing module can also be configured to demosaic each color channel by performing a first interpolation step to generate a y-plane for each color channel data and performing a second interpolation step to generate a z-plane for each color channel data. The processing module can also be configured to determine the output noise covariance by determining an intermediate noise covariance according to the input noise covariance and an autocorrelation for the x-plane of each color channel. The processing module can also be configured to determine the autocorrelation for the x-plane by correlating two or more images according to zero, one, or multiple shifts. The processing module can also be configured to determine the output noise covariance according to the intermediate noise covariance and an autocorrelation for the y-plane of each color channel. The processing module can also be configured to determine the autocorrelation for the y-plane by correlating the two or more images according to zero, one, or multiple shifts. The image sensing module can include a color filter array. The color filter array can be configured according to a Bayer pattern. The processing module can also be configured to define a periodic model associated with the input image signal, wherein the periodic model defines periodic boundary conditions for the input image signal.

BRIEF DESCRIPTION OF THE DRAWINGS

Embodiments of the spatial transformation models are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
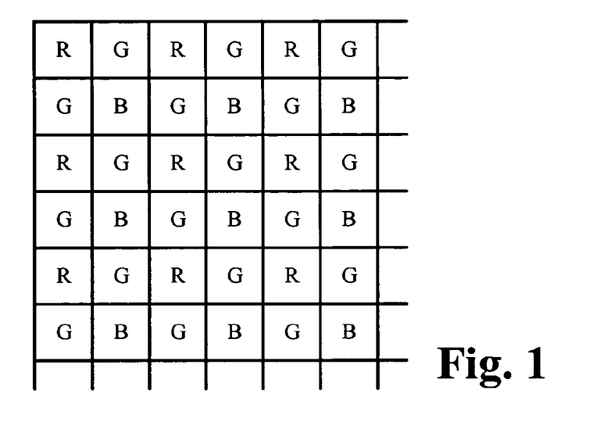
FIG. 1 illustrates an exemplary portion of a Bayer CFA.

In a first embodiment of the spatial transformation methodology, a demosaicing operation is performed to obtain the red, green, and blue color values at all spatial locations in the lattice from the information provided by the Bayer patterned CFA. In some embodiments, to reconstruct the missing values, the first spatial transformation method uses a 4-neighbor bilinear interpolation method. FIG. 1 illustrates an exemplary portion of a Bayer CFA. In this Bayer pattern illustrated in FIG. 1, there are 50% green pixels, 25% red pixels, and 25% blue pixels. To obtain the red, green, and blue color values for each pixel, 75% of the red pixels, 75% of the blue pixels, and 50% of the green pixels need to be reconstructed. The top left grid of the array is referred to as data element (0,0).

As shown in FIG. 1, before demosaicing, the data for the red channel $x_{i,j}$ is only available at even locations on the lattice. In general, for a P×P sensor array, red values are available at $\{x_{i,j}; i,j=\text{even}, 0 \leq i,j \leq P-2\}$, the blue values are available at $\{x_{i,j}; i,j=\text{odd}, 1 \leq i,j \leq P-1\}$, and the green values are available at locations $\{x_{i,j}; i+j=\text{odd}, 0 \leq i,j \leq P-1\}$. For ease of notation, a square sensor array P×P is described. However, all derivations described herein are valid for a rectangular sensor array P×Q. Also, when the array index in a summation increments by a step value other than 1, the step value is written after the initial value, for example to denote i that starts from 1 and goes to P-1 in steps of 2, the following notation is used:

$$\sum_{i=1,2}^{P-1}.$$

In the first spatial transformation method, a two step process is performed to obtain the interpolated red color channel. The blue color channel is demosaiced in a similar manner, and the green color channel is obtained by applying only the second interpolation step of the first method.

Figure 2:
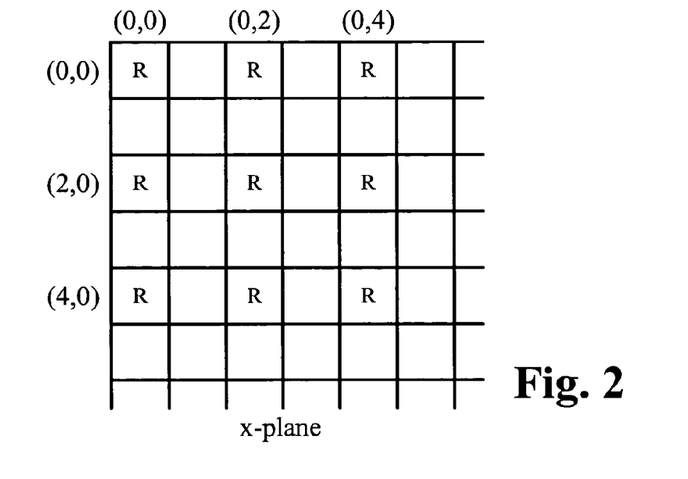
FIG. 2 illustrates the red color data initially available from the CFA of FIG. 1.

For a P×P color filter array, the total number of points, or pixels, in the CFA is $P^2$. The first spatial transformation method estimates values for the missing data points and derived expressions are provided for the mean and the variance of the signal after reconstruction. For simplicity, the following discussion is limited to the red channel. Red channel data is initially provided by the red sensors in the Bayer patterned CFA of FIG. 1. FIG. 2 illustrates the red color data initially available from the CFA of FIG. 1. By way of convention, the grid and corresponding data elements of FIG. 2 are referred to as the x-plane. In general, the red channel data in the x-plane is available on the lattice $\{x_{i,j}; i,j=\text{even}, 0 \leq i, j \leq P-2\}$ and consists of $P^2/4$ red data points. The variance of a random variable is a measure of its statistical dispersion, indicating how far from the expected value its values typically are. The variance of random variable 'x' is typically designated as $r^2_x$. Autocorrelation is a mathematical tool used frequently in signal processing for analyzing functions or series of values, such as time domain signals. Autocorrelation is the cross-correlation of a signal with itself. The following equations (1), (2), and (3) correspond to the mean, variance, and autocorrelation functions, respectively, for the initial red channel data in the x-plane:

$$u_x = \frac{4}{P^2} \sum_{i=0,2}^{P-2} \sum_{j=0,2}^{P-2} x_{i,j} \quad (1)$$

$$r_x^2 = \frac{4}{P^2} \sum_{i=0,2}^{P-2} \sum_{j=0,2}^{P-2} (x_{i,j} - u_x)^2, \quad (2)$$

$$g_{xx}(m,n) = \frac{4}{P^2} \sum_{i=0,2}^{P-2} \sum_{j=0,2}^{P-2} (x_{i,j} - u_x)(x_{i+2m,j+2n} - u_x) \quad (3)$$

Note that $g_{xx}(m,n) = g_{xx}(-m,-n)$.

Figure 3:
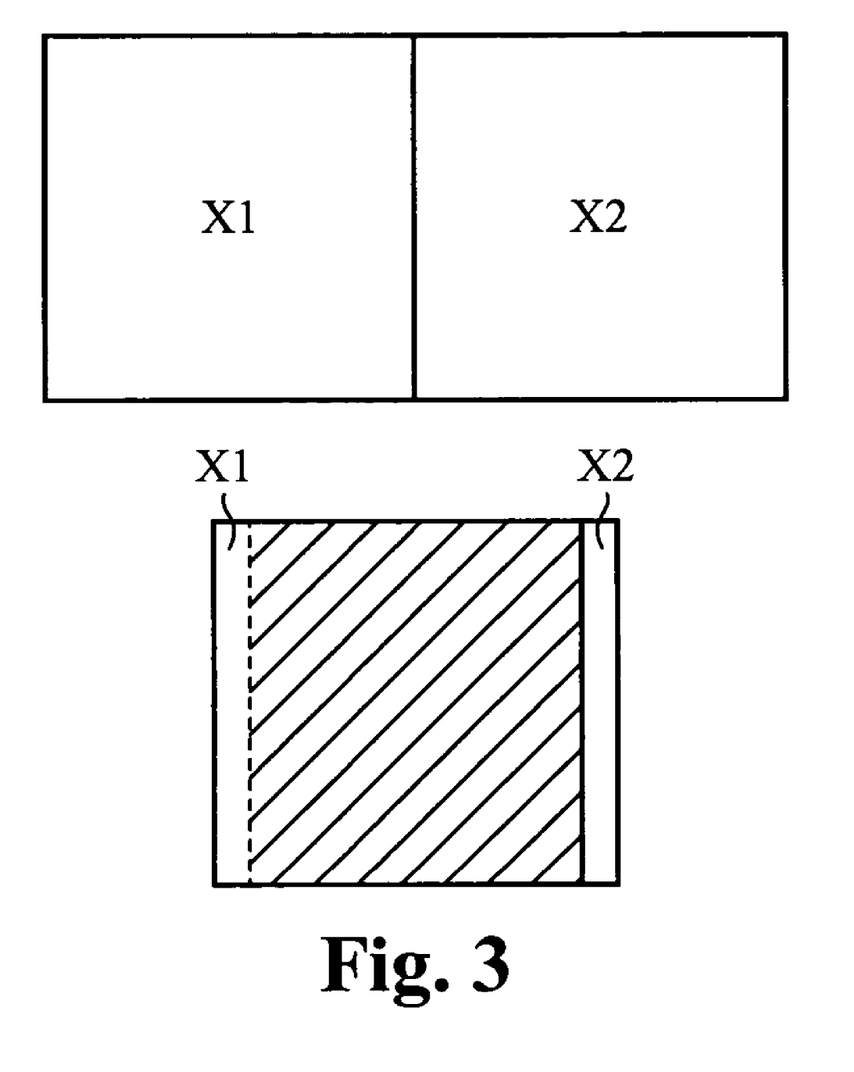
FIG. 3 illustrates the autocorrelation function $g_{xx}(0,1)$ between the image X1 and the image X2.

The autocorrelation function provides a comparison between successive images, or successive frames in a video sequence. For example, where there are successive images X1 and X2, an autocorrelation of $g_{xx}(0,0)$ means that there is no shift between the two successive images X1 and X2. For an autocorrelation of $g_{xx}(0,1)$, the image X2 is shifted by one to the right compared to the image X1. FIG. 3 illustrates the autocorrelation function $g_{xx}(0,1)$ between the image X1 and the image X2. As can be seen in FIG. 3, the image X2 is shifted by one to the right compared to the image X1. The shaded area shows the correlation between the image X1 and the image X2. The amount of correlation indicates how dependent a current frame is to its previous frame.

Figure 4:
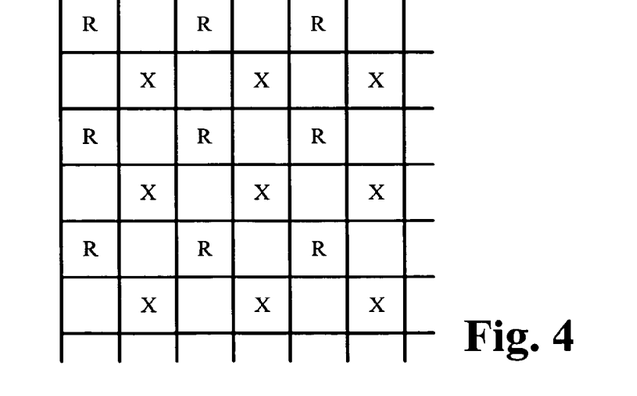
FIG. 4 illustrates the initial red channel data in the original lattice and the red channel data to be reconstructed in the interlacing lattice.
Figure 5:
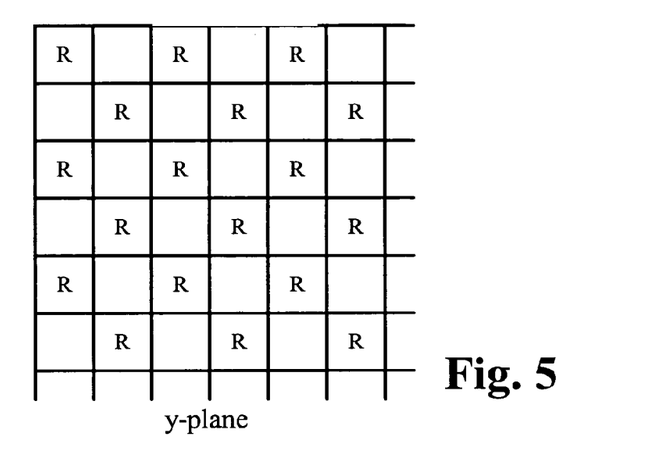
FIG. 5 illustrates a combined signal for the red channel data after completion of the first step.

A first step of the first spatial transformation method is to reconstruct the red channel data at an interlacing lattice $\{x_{i,j}; i,j=\text{odd}, 1 \leq i,j \leq P-1\}$ from the lattice $\{x_{i,j}; i,j=\text{even}, 0 \leq i, j \leq P-2\}$. The points on the interlacing lattice correspond to the same points as the blue data elements in FIG. 1. FIG. 4 illustrates the initial red channel data in the original lattice $\{x_{i,j}; i,j=\text{even}, 0 \leq i,j \leq P-2\}$ as R points, and the red channel data to be reconstructed in the interlacing lattice $\{x_{i,j}, 1 \leq i, j=\text{odd}, i,j \leq P-1\}$ as X points. The red color value of each X point in the interlacing lattice is obtained by averaging the red color value of the four nearest neighbor R points in the original lattice. Once this first step is completed, the resulting signal is a combination of the initial red channel data corresponding to the original lattice and the reconstructed red channel data corresponding to the interlacing lattice. FIG. 5 illustrates a combined signal for the red channel data after completion of the first step. By way of convention, the grid and corresponding data elements of FIG. 5 are referred to as the y-plane. As seen in FIG. 5, the combined signal consists of $P^2/2$ points, R points, on the lattice $\{y_{i,j}; i+j=\text{even}, 0 \leq i,j \leq P-1\}$. The red values of each of the R points in the y-plane is expressed as:

$$y_{i,j} = \begin{cases} x_{i,j} & i, j \text{ even} \\ \frac{1}{4}(x_{i-1,j-1} + x_{i-1,j+1} + x_{i+1,j-1} + x_{i+1,j+1}). & i, j \text{ odd} \end{cases} \quad (4)$$

From equation (4), the mean of $y_{i,j}$ is written as:

$$u_y = \frac{2}{P^2} \sum_{i=0,2}^{P-2} \sum_{j=0,2}^{P-2} x_{i,j} + \frac{1}{2P^2} \sum_{i=1,2}^{P-1} \sum_{j=1,2}^{P-1} (x_{i-1,j-1} + x_{i-1,j+1} + x_{i+1,j-1} + x_{i+1,j+1}).$$

Changing the variables in the summation and using equation (1) results in:

$$u_y = \frac{1}{2}u_x + \frac{1}{2P^2}\sum_{i=0,2}^{P-2}\sum_{j=0,2}^{P-2} x_{i,j} +$$

$$\frac{1}{2P^2}\sum_{i=0,2}^{P-2}\sum_{j=2,2}^{P} x_{i,j} + \frac{1}{2P^2}\sum_{i=2,2}^{P}\sum_{j=0,2}^{P-2} x_{i,j} + \frac{1}{2P^2}\sum_{i=2,2}^{P}\sum_{j=2,2}^{P} x_{i,j}.$$

Assuming that the color filter array is periodic, with period P in each dimension, the boundary values are written as $x_{i,P}=x_{i,0}$, $x_{P,j}=x_{0,j}$, and $x_{P,P}=x_{0,0}$. Therefore, $u_y$ becomes:

$$u_y = \frac{1}{2}u_x + \frac{1}{8}u_x + \frac{1}{2P^2}\sum_{i=0,2}^{P-2}\sum_{j=0,2}^{P-2} x_{i,j} + \frac{1}{2P^2}\sum_{i=0,2}^{P-2}\sum_{j=0,2}^{P-2} x_{i,j} + \frac{1}{2P^2}\sum_{i=0,2}^{P-2}\sum_{j=0,2}^{P-2} x_{i,j},$$

and using equation (1), $$u_y = u_x \quad (5)$$

So the mean does not change from the x-plane to the y-plane, as is to be expected. The mean is a first order operation which should not change in a demosaicing operation. Using equations (4) and (5), the variance of $y_{i,j}$ is written as:

$$r_y^2 = \frac{2}{P^2}\sum_{i=0,2}^{P-2}\sum_{j=0,2}^{P-2}(x_{i,j} - u_x)^2 +$$

$$\frac{1}{8P^2}\sum_{i=1,2}^{P-1}\sum_{j=1,2}^{P-1}(x_{i-1,j-1} + x_{i-1,j+1} + x_{i+1,j+1} - 4u_x)^2.$$

Substituting equation (2) and a change of variables results in:

$$r_y^2 = \frac{1}{2}r_x^2 + \frac{1}{8P^2}\sum_{i=0,2}^{P-2}\sum_{j=0,2}^{P-2}(x_{i,j} - u_x)^2 +$$

$$\frac{1}{8P^2}\sum_{i=0,2}^{P-2}\sum_{j=2,2}^{P}(x_{i,j} - u_x)^2 + \frac{1}{8P^2}\sum_{i=2,2}^{P}\sum_{j=0,2}^{P-2}(x_{i,j} - u_x)^2 +$$

$$\frac{1}{8P^2}\sum_{i=2,2}^{P}\sum_{j=2,2}^{P}(x_{i,j} - u_x)^2 + \frac{1}{4P^2}\sum_{i=0,2}^{P-2}\sum_{j=0,2}^{P-2}(x_{i,j} - u_x)(x_{i,j+2} - u_x) +$$

$$\frac{1}{4P^2}\sum_{i=0,2}^{P-2}\sum_{j=0,2}^{P-2}(x_{i,j} - u_x)(x_{i,j+2} - u_x) +$$

$$\frac{1}{4P^2}\sum_{i=0,2}^{P-2}\sum_{j=0,2}^{P-2}(x_{i,j} - u_x)(x_{i+2,j+2} - u_x) +$$

$$\frac{1}{4P^2}\sum_{i=0,2}^{P-2}\sum_{j=2,2}^{P}(x_{i,j} - u_x)(x_{i+2,j-2} - u_x) +$$

$$\frac{1}{4P^2}\sum_{i=0,2}^{P-2}\sum_{j=2,2}^{P}(x_{i,j} - u_x)(x_{i+2,j} - u_x) +$$

$$\frac{1}{4P^2}\sum_{i=2,2}^{P}\sum_{j=0,2}^{P-2}(x_{i,j} - u_x)(x_{i,j+2} - u_x).$$

Noting that the color filter array is assumed to be periodic, with period P in each dimension, and using equations (2) and (3), the covariance of $y_{i,j}$ is:

$$r_y^2 = \frac{5}{8}r_x^2 +$$

$$\frac{1}{16}(g_{xx}(0,1) + g_{xx}(1,0) + g_{xx}(1,1) + g_{xx}(1,-1) + g_{xx}(1,0) + g_{xx}(0,1)).$$

Since $g_{xx}(m,n)=g_{xx}(-m,-n)$:

$$r_y^2 = \frac{5}{8}r_x^2 + \frac{1}{8}(g_{xx}(0,1)+g_{xx}(1,0)) + \frac{1}{16}(g_{xx}(1,-1)+g_{xx}(1,1)). \quad (6)$$

The mean and variance expressed in equations (5) and (6), respectively, correspond to the combined signal on the lattice $\{y_{i,j}; i+j=\text{even}, 0 \leq i,j \leq P-1\}$, as indicated in FIG. 5. In the following second step, expressions are derived for the mean and the variance corresponding to the fully reconstructed red channel data.

Figure 6:
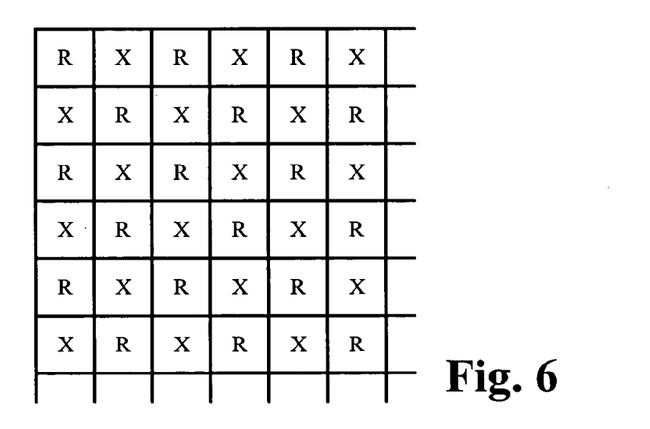
FIG. 6 illustrates the red channel data in the combined signal lattice and the red channel data to be reconstructed in the second interlacing lattice.
Figure 7:
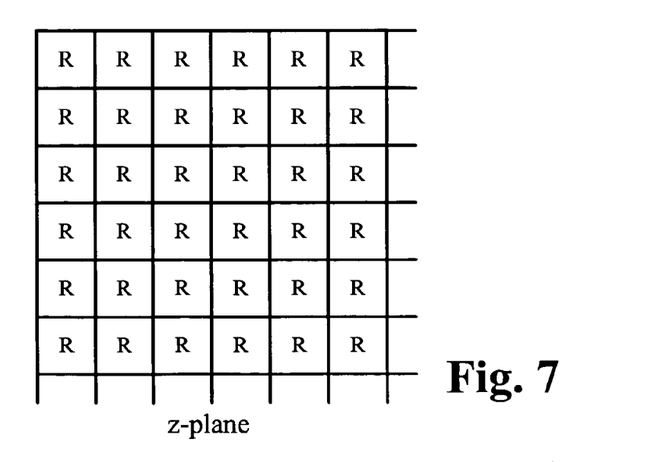
FIG. 7 illustrates a fully reconstructed signal for the red channel data after completion of the second step.

The second step of the first spatial transformation method is to reconstruct the red channel data at a second interlacing lattice $\{y_{i,j}; i+j=\text{odd}, 1 \leq i,j \leq P-1\}$ from the combined signal lattice $\{y_{i,j}; i+j=\text{even}, 0 \leq i,j \leq P-2\}$. The points on the second interlacing lattice correspond to the same points as the green data elements in FIG. 1. The points on the combined signal lattice correspond to the R points in FIG. 5. FIG. 6 illustrates the red channel data in the combined signal lattice $\{y_{i,j}; i+j=\text{even}, 0 \leq i,j \leq P-2\}$ as R points, and the red channel data to be reconstructed in the second interlacing lattice $\{y_{i,j}; i+j=\text{odd}, 1 \leq i,j \leq P-1\}$ as X points. The red color value of each X point in the second interlacing lattice is obtained by averaging the red color value of the four nearest neighbor R points in the combined signal lattice. Once this second step is completed, the resulting signal is a combination of the red channel data corresponding to the combined signal lattice and the reconstructed red channel data corresponding to the second interlacing lattice. This resulting signal is the fully reconstructed red channel data. FIG. 7 illustrates a fully reconstructed signal for the red channel data after completion of the second step. By way of convention, the grid and corresponding data elements of FIG. 7 are referred to as the z-plane. As seen in FIG. 7, the combined signal consists of $P^2$ R points, on the $P \times P$ lattice $\{y_{i,j}; 0 \leq i,j \leq P-1\}$. The red values of each of the R points in the z-plane is expressed as:

$$z_{i,j} = \begin{cases} y_{i,j} & i+j \text{ even} \\ \frac{1}{4}(y_{i-1,j}+y_{i+1,j}+y_{i,j-1}+y_{i,j+1}) & i+j \text{ odd} \end{cases} \quad (7)$$

From equation (7), the mean of $z_{i,j}$ is written as:

$$u_z = \frac{1}{P^2}\sum_{i=0,2}^{P-2}\sum_{j=0,2}^{P-2} y_{i,j} + \frac{1}{P^2}\sum_{i=1,2}^{P-1}\sum_{j=1,2}^{P-1} y_{i,j} +$$
$$\frac{1}{4P^2}\sum_{i=0,2}^{P-2}\sum_{j=1,2}^{P-1}(y_{i-1,j}+y_{i+1,j}+y_{i,j-1}+y_{i,j+1}) +$$
$$\frac{1}{4P^2}\sum_{i=1,2}^{P-1}\sum_{j=0,2}^{P-2}(y_{i-1,j}+y_{i+1,j}+y_{i,j-1}+y_{i,j+1}).$$

Changing the variables in the summation and Noting that the color filter array is assumed to be periodic, with period P in each dimension, the mean $u_z$ is written as:

$$u_z = \frac{2}{P^2}\sum_{i=0,2}^{P-2}\sum_{j=0,2}^{P-2} y_{i,j} + \frac{2}{P^2}\sum_{i=1,2}^{P-1}\sum_{j=1,2}^{P-1} y_{i,j},$$

and using equations (1) and (5), $$u_z = u_y \quad (8)$$

So the mean does not change from the y-plane to the z-plane, as is to be expected. Using equations (7) and (8), the variance of $z_{i,j}$ is written as:

$$r_x^2 = \frac{1}{P^2}\sum_{i=0,2}^{P-2}\sum_{j=0,2}^{P-2}(y_{i,j}-u_y)^2 + \frac{1}{P^2}\sum_{i=1,2}^{P-1}\sum_{j=1,2}^{P-1}(y_{i,j}-u_y)^2 +$$
$$\frac{1}{16P^2}\sum_{i=0,2}^{P-2}\sum_{j=1,2}^{P-1}(y_{i-1,j}+y_{i+1,j}+y_{i,j-1}+y_{i,j+1}-4u_y)^2$$
$$\frac{1}{16P^2}\sum_{i=1,2}^{P-1}\sum_{j=0,2}^{P-2}(y_{i-1,j}+y_{i+1,j}+y_{i,j-1}+y_{i,j+1}-4u_y)^2.$$

Again it is noted that the color filter array is assumed to be periodic, with period P in each dimension. By expanding the squared terms, changing variables, and noting that $g_{yy}(m,n) = g_{yy}(-m,-n)$, the covariance of $z_{i,j}$ becomes:

$$r_z^2 = \frac{5}{8}r_y^2 + \frac{1}{8}(g_{yy}(1,-1)+g_{yy}(1,1)) + \frac{1}{16}(g_{yy}(2,0)+g_{yy}(0,2)). \quad (9)$$

The blue channel data is fully reconstructed in a manner similar to that described above to fully reconstruct the red channel data. To obtain the fully reconstructed green channel data, only the second step of the first spatial transformation method described above is performed.

It is shown that the demosaicing operation performed according to the first spatial transformation method does not alter the mean, while the noise covariance after the demosaicing operation is expressed in terms of the input noise covariance and autocorrelation function computed for a small number of shifts. In other words, the covariance before demosaicing is noise dependent, while the covariance after demosaicing depends not only on the input covariance, but also the autocorrelation function of the input image.

Figure 8:
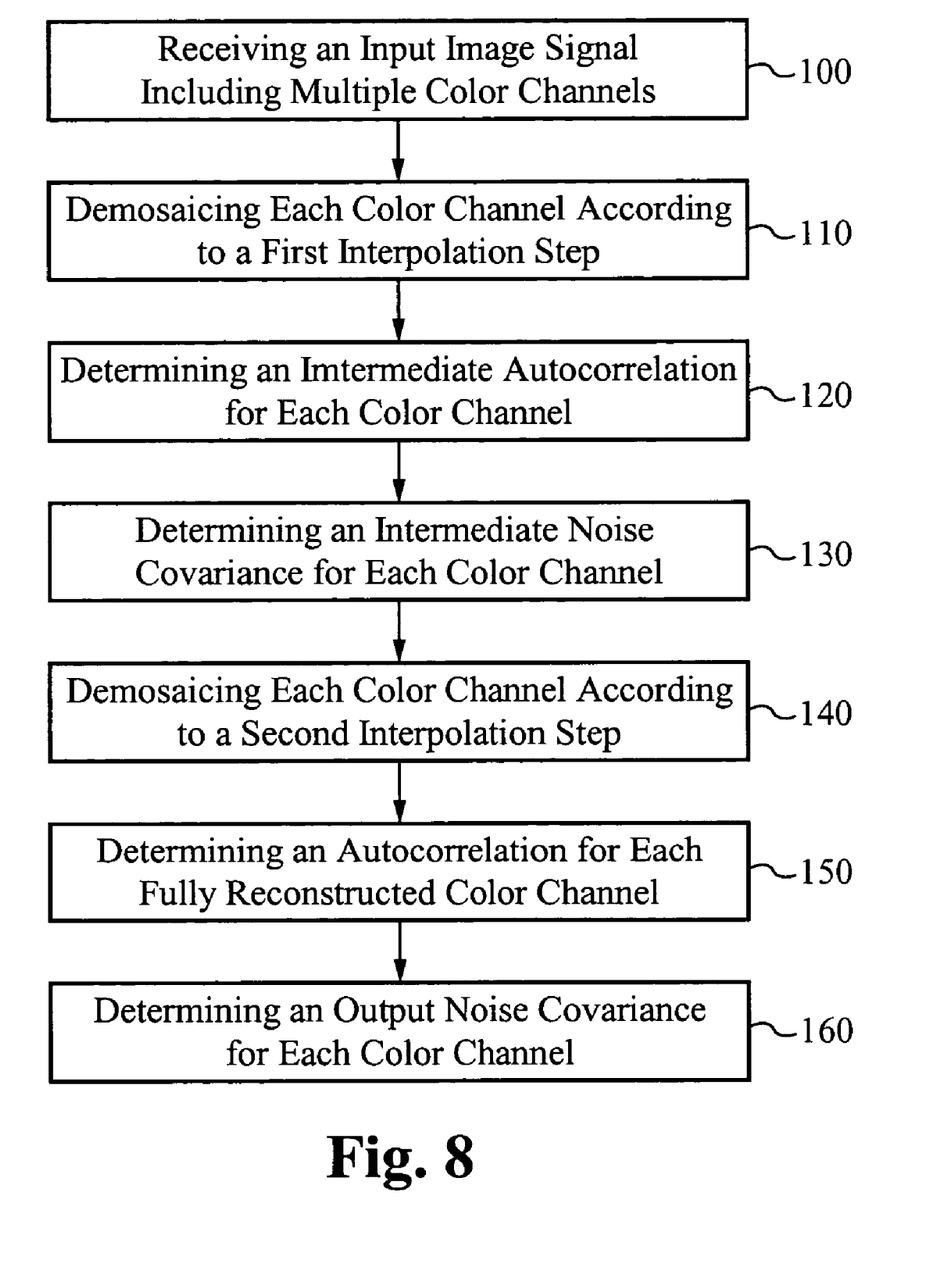
FIG. 8 illustrates a method of predicting an output noise variance resulting from a spatial demosaicing transformation.

FIG. 8 illustrates a method of predicting an output noise variance resulting from a spatial demosaicing transformation. At the step 100, an input image signal is received. The input image signal includes multiple color channels, each channel with a corresponding input noise covariance. Each color channel includes only a portion of the color data for a fully reconstructed color channel At the step 110, demosiacing of each color channel is performed according to a first interpolation step. The first interpolation step determines a first portion of the missing color data for each color channel. At the step 120, an intermediate autocorrelation is determined for each color. The intermediate autocorrelation corresponds to the input image signal and the determined first portion of the missing color data for each color channel. At the step 130, an intermediate noise covariance is determined for each color channel. The intermediate noise covariance is determined according to the input noise covariance and the intermediate autocorrelation. At the step 140, demosaicing of each color channel is performed according to a second interpolation step. The second interpolation step determines a second and final portion of the missing color data for each color channel, whereby the color data for each color channel is fully reconstructed. At the step 150, an autocorrelation for each fully reconstructed color channel is determined. At the step 160, an output noise covariance is predicted for each color channel. The output noise covariance is predicted according to the input noise covariance and the autocorrelation for each color channel.

Figure 9:
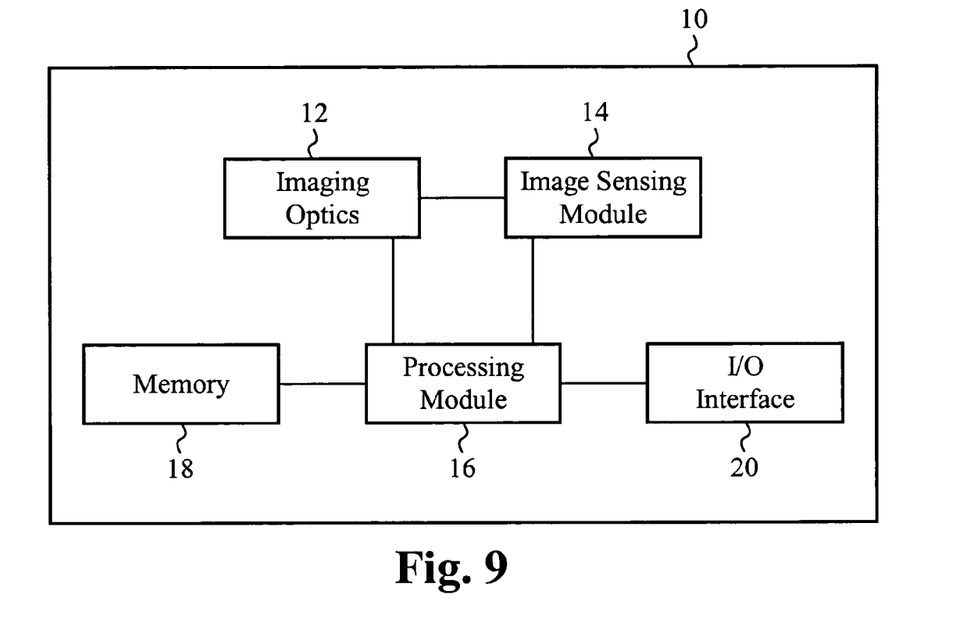
FIG. 9 illustrates a block diagram of an exemplary image capturing system configured to operate according to the first spatial transformation method.

In one embodiment, the first spatial transformation method is implemented as a computer program utilized in an image capturing system, such as a camera or a camcorder. Use of the first spatial transformation method enables prediction of the output noise resulting from spatial transformation operations. FIG. 9 illustrates a block diagram of an exemplary image capturing system 10 configured to operate according to the first spatial transformation method. The image capturing system 10 is any device capable of capturing an image or video sequence. The image capturing system 10 includes imaging optics 12, an image sensing module 14, a processing module 16, a memory 18, and an input/output (I/O) interface 20. The imaging optics 12 include any conventional optics to receive an input light representative of an image to be captured, to filter the input light, and to direct the filtered light to the image sensing module 14. Alternatively, the imaging optics 12 do not filter the input light. The image sensing module 14 includes one or more sensing elements to detect the filtered light. Alternatively, the image sensing module 14 includes a color filter array to filter the input light and one or more sensing elements to detect the light filtered by the color filter array.

The memory 18 can include both fixed and removable media using any one or more of magnetic, optical or magneto-optical storage technology or any other available mass storage technology. The processing module 16 is configured to control the operation of the image capturing system 10. In some embodiments, the processing module 16 is also configured to perform the spatial demosaicing transformations and the output noise prediction methodology described above. The I/O interface 20 includes a user interface and a network interface. In some embodiments, the user interface includes a display to show user instructions, feedback related to input user commands, and/or the images captured and processed by the imaging optics 12, the image sensing module 14, and the processing module 16. The network interface 20 includes a physical interface circuit for sending and receiving imaging data and control communications over a conventional network.

The first spatial transformation method described above uses 4-neighbor bilinear interpolation. In general, an x-neighbor bilinear interpolation is performed where the number of neighbors can be uniformly distributed or randomly distributed. Further, the spatial transformation methodology is described above in relation to a three color CFA configured in a Bayer pattern. It is understood that the spatial transformation methodology can be applied to alternative configurations other than the Bayer pattern, which may require more than the one or two steps described above to interpolate the color value at each point in the lattice. It is further understood that alternative CFA's can be used to the three color CFA described above.

Although the noise prediction scheme is described above in the context of demosaicing, this noise prediction scheme is extendable to noise prediction across other spatial transformations, including, but not limited to demosaicing, edge enhancement, and filtering.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of predicting noise propagation after performing a demosaicing operation, the method comprising:
   a. obtaining an input image signal including a plurality of color channels, each color channel including a portion of a corresponding color channel data, wherein the input image signal includes a corresponding input noise covariance;
   b. demosaicing each color channel to determine a remaining portion of each color channel data;
   c. determining an autocorrelation for each color channel;
   d. determining an output noise covariance for each color channel according to the input noise covariance and the autocorrelation for the corresponding color channel; and
   wherein demosaicing each color channel, determining an autocorrelation for each color channel and determining an output noise covariance for each color channel are performed by a processor.

2. The method of claim 1 wherein demosaicing comprises performing a bilinear interpolation.

3. The method of claim 2 wherein demosaicing comprises performing a 4-neighbor bilinear interpolation.

4. The method of claim 3 wherein each color channel data of the input image signal corresponds to an x-plane and demosaicing comprises performing a first interpolation step to generate a y-plane for each color channel data and performing a second interpolation step to generate a z-plane for each color channel data.

5. The method of claim 4 wherein determining the output noise covariance comprises determining an intermediate noise covariance according to the input noise covariance and an autocorrelation for the x-plane of each color channel.

6. The method of claim 5 wherein the autocorrelation for the x-plane is determined by correlating two or more images according to zero, one, or multiple shifts.

7. The method of claim 5 wherein the intermediate noise covariance, $r^2_y$, is determined according to:

$$r^2_y = \frac{5}{8}r^2_x + \frac{1}{8}(g_{xx}(0,1) + g_{xx}(1,0)) + \frac{1}{16}(g_{xx}(1,-1) + g_{xx}(1,1)),$$

wherein $r^2_x$ is the input noise covariance and $g_{xx}$ is the autocorrelation for the x-plane.

8. The method of claim 6 wherein the output noise covariance is determined according to the intermediate noise covariance and an autocorrelation for the y-plane of each color channel.

9. The method of claim 8 wherein the autocorrelation for the y-plane is determined by correlating the two or more images according to zero, one, or multiple shifts.

10. The method of claim 7 wherein the output noise covariance, $r^2_z$, is determined according to:

$$r^2_z = \frac{5}{8}r^2_y + \frac{1}{8}(g_{yy}(1,-1) + g_{yy}(1,1)) + \frac{1}{16}(g_{yy}(2,0) + g_{yy}(0,2)),$$

wherein $r^2_y$ is the intermediate noise covariance and $g_{yy}$ is the autocorrelation for the y-plane.

11. The method of claim 1 further comprising providing the input image signal from a color filter array.

12. The method of claim 11 wherein the color filter array is configured according to a Bayer pattern.

13. The method of claim 1 further comprising defining a periodic model associated with the input image signal, wherein the periodic model defines periodic boundary conditions for the input image signal.

14. A method of predicting noise propagation after performing a spatial transformation operation, the method comprising:
  a. obtaining an input image signal, wherein the input image signal includes a corresponding input noise covariance;
  b. performing a spatial transformation operation using interpolation on the input image signal;
  c. determining an autocorrelation function corresponding to the input image signal;
  d. determining an output noise covariance according to the input noise covariance and the autocorrelation function; and
  wherein performing a spatial transformation, determining an autocorrelation function and determining an output noise covariance are performed by a processor.

15. The method of claim 14 wherein the spatial transformation operation comprises a non-linear filtering operation.

16. The method of claim 14 wherein the spatial transformation operation comprises a sharpening operation.

17. The method of claim 14 wherein the spatial transformation operation comprises a linear filtering operation.

18. The method of claim 14 wherein the spatial transformation operation comprises a demosaicing operation.

19. The method of claim 14 further comprising providing the input image signal from a color filter array.

20. The method of claim 19 wherein the color filter array is configured according to a Bayer pattern.

21. A computer readable medium including program instructions for execution on a processor coupled to an image capturing system, which when executed by the processor, causes the image capturing system to perform:
  a. obtaining an input image signal including a plurality of color channels, each color channel including a portion of a corresponding color channel data, wherein the input image signal includes a corresponding input noise covariance;
  b. demosaicing each color channel to determine a remaining portion of each color channel data;
  c. determining an autocorrelation for each color channel; and
  d. determining an output noise covariance for each color channel according to the input noise covariance and the autocorrelation for the corresponding color channel.

22. The computer readable medium of claim 21 wherein demosaicing comprises performing a bilinear interpolation.

23. The computer readable medium of claim 22 wherein demosaicing comprises performing a 4-neighbor bilinear interpolation.

24. The computer readable medium of claim 23 wherein each color channel data of the input image signal corresponds to an x-plane and demosaicing comprises performing a first interpolation step to generate a y-plane for each color channel data and performing a second interpolation step to generate a z-plane for each color channel data.

25. The computer readable medium of claim 24 wherein determining the output noise covariance comprises determining an intermediate noise covariance according to the input noise covariance and an autocorrelation for the x-plane of each color channel.

26. The computer readable medium of claim 25 wherein the autocorrelation for the x-plane is determined by correlating two or more images according to zero, one, or multiple shifts.

27. The computer readable medium of claim 25 wherein the intermediate noise covariance, $r^2_y$, is determined according to:

$$r^2_y = \frac{5}{8}r^2_x + \frac{1}{8}(g_{xx}(0,1) + g_{xx}(1,0)) + \frac{1}{16}(g_{xx}(1,-1) + g_{xx}(1,1)),$$

wherein $r^2_x$ is the input noise covariance and $g_{xx}$ is the autocorrelation for the x-plane.

28. The computer readable medium of claim 26 wherein the output noise covariance is determined according to the intermediate noise covariance and an autocorrelation for the y-plane of each color channel.

29. The computer readable medium of claim 28 wherein the autocorrelation for the y-plane is determined by correlating the two or more images according to zero, one, or multiple shifts.

30. The computer readable medium of claim 27 wherein the output noise covariance, $r^2_z$, is determined according to:

$$r^2_z = \frac{5}{8}r^2_y + \frac{1}{8}(g_{yy}(1,-1) + g_{yy}(1,1)) + \frac{1}{16}(g_{yy}(2,0) + g_{yy}(0,2)),$$

wherein $r^2_y$ is the intermediate noise covariance and $g_{yy}$ is the autocorrelation for the y-plane.

31. The computer readable medium of claim 21 further comprising providing the input image signal from a color filter array.

32. The computer readable medium of claim 31 wherein the color filter array is configured according to a Bayer pattern.

33. The computer readable medium of claim 21 further comprising defining a periodic model associated with the input image signal, wherein the periodic model defines periodic boundary conditions for the input image signal.

34. An image capturing system comprising:
  a. an image sensing module to detect an input image signal, wherein the input image signal includes a plurality of color channels, each color channel including a portion of a corresponding color channel data, further wherein the input image signal includes a corresponding input noise covariance;
  b. a processing module coupled to the image sensing module, wherein the processing module is configured to demosaic each color channel to determine a remaining portion of each color channel data, to determine an autocorrelation for each color channel, and to determine an output noise covariance for each color channel according to the input noise covariance and the autocorrelation for the corresponding color channel.

35. The image capturing system of claim 34 further comprising imaging optics to receive input light from an image, to filter the received input light to form the input image signal, and to provide the input image signal to the image sensing module.

36. The image capturing system of claim 34 wherein the processing module is configured to demosaic each color channel by performing a bilinear interpolation.

37. The image capturing system of claim 36 wherein the bilinear interpolation comprises a 4-neighbor bilinear interpolation.

38. The image capturing system of claim 37 wherein each color channel data of the input image signal corresponds to an x-plane and the processing module is configured to demosaic each color channel by performing a first interpolation step to generate a y-plane for each color channel data and performing a second interpolation step to generate a z-plane for each color channel data.

39. The image capturing system of claim 38 wherein the processing module is configured to determine the output noise covariance by determining an intermediate noise covariance according to the input noise covariance and an autocorrelation for the x-plane of each color channel.

40. The image capturing system of claim 39 wherein the processing module is configured to determine the autocorrelation for the x-plane by correlating two or more images according to zero, one, or multiple shifts.

41. The image capturing system of claim 39 wherein the intermediate noise covariance, $r^2_y$, is determined according to:

$$r^2_y = \frac{5}{8}r^2_x + \frac{1}{8}(g_{xx}(0,1) + g_{xx}(1,0)) + \frac{1}{16}(g_{xx}(1,-1) + g_{xx}(1,1)),$$

wherein $r^2_x$ is the input noise covariance and $g_{xx}$ is the autocorrelation for the x-plane.

42. The image capturing system of claim 40 wherein the processing module is configured to determine the output noise covariance according to the intermediate noise covariance and an autocorrelation for the y-plane of each color channel.

43. The image capturing system of claim 42 wherein the processing module is configured to determine the autocorrelation for the y-plane by correlating the two or more images according to zero, one, or multiple shifts.

44. The image capturing system of claim 41 wherein the output noise covariance, $r^2_z$, is determined according to:

$$r^2_z = \frac{5}{8}r^2_y + \frac{1}{8}(g_{yy}(1,-1) + g_{yy}(1,1)) + \frac{1}{16}(g_{yy}(2,0) + g_{yy}(0,2)),$$

wherein $r^2_y$ is the intermediate noise covariance and $g_{yy}$ is the autocorrelation for the y-plane.

45. The image capturing system of claim 34 wherein the image sensing module includes a color filter array.

46. The image capturing system of claim 45 wherein the color filter array is configured according to a Bayer pattern.

47. The image capturing system of claim 34 wherein the processing module is further configured to define a periodic model associated with the input image signal, wherein the periodic model defines periodic boundary conditions for the input image signal.

* * * * *